(12) United States Patent
Nemoto (10) Patent No.: US 8,111,703 B2
(45) Date of Patent: Feb. 7, 2012

(54) IP TELEPHONE REPEATER, IP TELEPHONE REPEATING SYSTEM AND IP TELEPHONE REPEATING METHOD

(75) Inventor: Hiroyuki Nemoto, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1322 days.

(21) Appl. No.: 11/790,392

(22) Filed: Apr. 25, 2007

(65) Prior Publication Data

US 2007/0286167 A1    Dec. 13, 2007

(30) Foreign Application Priority Data

May 12, 2006    (JP) .................... 2006-134036

(51) Int. Cl.
*H04B 7/00* (2006.01)
(52) U.S. Cl. ...................................... 370/401
(58) Field of Classification Search .............. None
See application file for complete search history.

(56) References Cited

U.S. PATENT DOCUMENTS

| | | | | |
|---|---|---|---|---|
| 6,826,173 | B1 * | 11/2004 | Kung et al. ............... | 370/352 |
| 2004/0030785 | A1 * | 2/2004 | Katoh ...................... | 709/227 |
| 2005/0002500 | A1 | 1/2005 | Kumai | |

FOREIGN PATENT DOCUMENTS

| | | |
|---|---|---|
| JP | 02-140043 | 5/1990 |
| JP | 03-158096 | 7/1991 |
| JP | 5-284227 | 10/1998 |
| JP | 2001-203756 | 7/2001 |
| JP | 2003-324525 | 11/2003 |
| JP | 2004-242090 | 8/2004 |
| JP | 2006-054654 | 2/2006 |

OTHER PUBLICATIONS

Notice of Reasons for Rejection, mailed Aug. 17, 2010, in Japanese Patent Application No. 2006-134036, and English language translation thereof (7 pages).

* cited by examiner

*Primary Examiner* — Chirag Shah
*Assistant Examiner* — Salvador E Rivas
(74) *Attorney, Agent, or Firm* — Finnegan, Henderson, Farabow, Garrett & Dunner, L.L.P.

(57) ABSTRACT

An IP telephone repeater includes a first communication portion connected to an internet IP telephone network, a second communication portion connected to a local area IP telephone network, and a call controller which supplies, upon receipt of an incoming call via the first communication portion from the internet IP telephone network, a jingle signal to the incoming call and to a plurality of terminals connected to the second communication portion, and which supplies a holding tone to the incoming call and supplies the jingle signal to the plurality of terminals connected to the second communication portion in the case where a response operation of a non-audio terminal connected to the second communication portion is conducted.

12 Claims, 7 Drawing Sheets

| Terminal 1 | Digital television set (including remote controller) | Non-audio terminal |
|---|---|---|
| Terminal 2 | IP telephone | Audio terminal |
| Terminal 3 | AV component (including remote controller) | Non-audio terminal |
| Terminal 4 | DVD recorder (including remote controller) | Non-audio terminal |
| Terminal 5 | Mobile telephone | Audio terminal |
| Terminal 6 | | |
| Terminal 7 | | |
| | | |
| | | |

FIG. 7

IP TELEPHONE REPEATER, IP TELEPHONE REPEATING SYSTEM AND IP TELEPHONE REPEATING METHOD

CROSS-REFERENCE TO RELATED APPLICATIONS

This application is based upon and claims the benefit of priority from Japanese Patent Application No. 2006-134036, filed May 12, 2006, the entire contents of which are incorporated herein by reference.

BACKGROUND

1. Field

The present invention relates to an IP telephone repeater, and more particularly to an IP telephone repeater for conducting an operation using a non-audio terminal, an IP telephone repeating system and an IP telephone repeating method.

2. Description of the Related Art

In recent years, an application technology of the internet has become prevalent and been spreading. With respect to the IP telephone which is an application technology thereof, a wide scope of application technology is known.

Patent Document 1 (Jpn. Pat. Appln. KOKAI Publication No. 2004-242090) discloses that, in an IP telephone system, a substitute response signal from a terminal for conducting a substitute response is received by an IP server thereby conducting a repetition control of a call from a terminal of a call sender.

However, in the prior art of the patent document 1, the control object is limited to an IP telephone terminal which enables a telephone call. No reference is made as to how the IP terminal which does not enable phone call is handled.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there are provided an IP telephone repeater which is capable of providing an instant response to the other party of a telephone call by using an IP terminal serving as a non-audio terminal, an IP telephone repeating system and an IP telephone repeating method.

An IP telephone repeater according to the present invention comprises: a first communication portion connected to an internet IP telephone network; a second communication portion connected to a local area IP telephone network; and a call controller which supplies, upon receipt of an incoming call via the first communication portion from the internet IP telephone network, a jingle signal to the incoming call and to a plurality of terminals connected to the second communication portion, and which supplies a holding tone to the incoming call and supplies the jingle signal to said plurality of terminals connected to the second communication portion in the case where a response operation of a non-audio terminal connected to the second communication portion is conducted.

In the IP telephone repeater according to the present invention, for example, by answering the incoming call using a remote controller of a digital TV which is a domestic IP terminal serving as a non-audio terminal, a call signal is changed over to a holding tone signal for the other party. Thus, it is possible to solve a disadvantage that the telephone is held on for a long time on the other side of the call.

Hereinafter, embodiments of the present invention will be explained by referring to the drawings.

Figure 1:
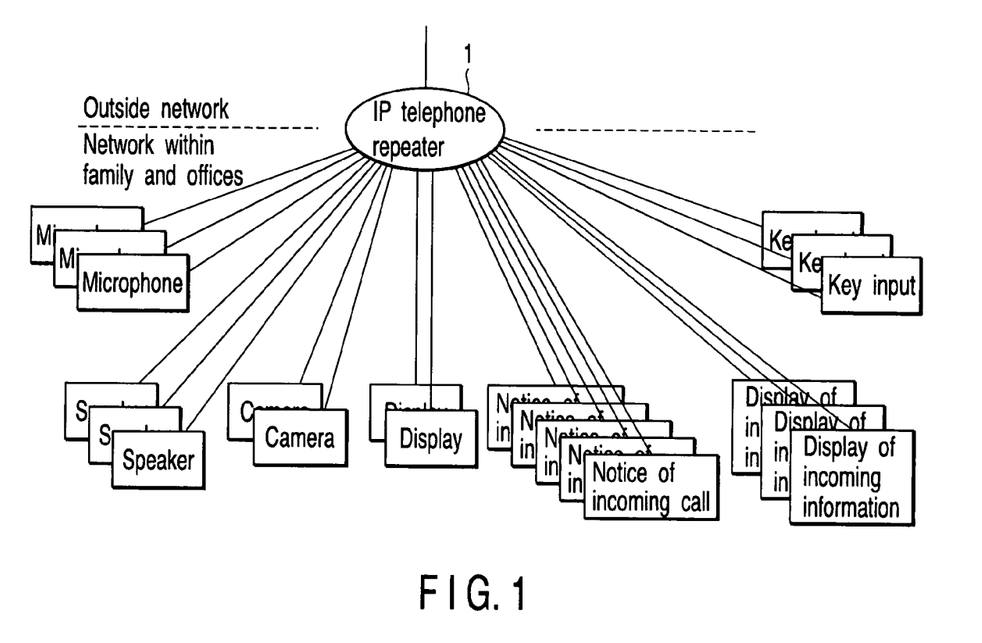
FIG. 1 is a schematic diagram for explaining one example of a functional structure of an IP telephone repeater according to one embodiment of the present invention.
Figure 2:
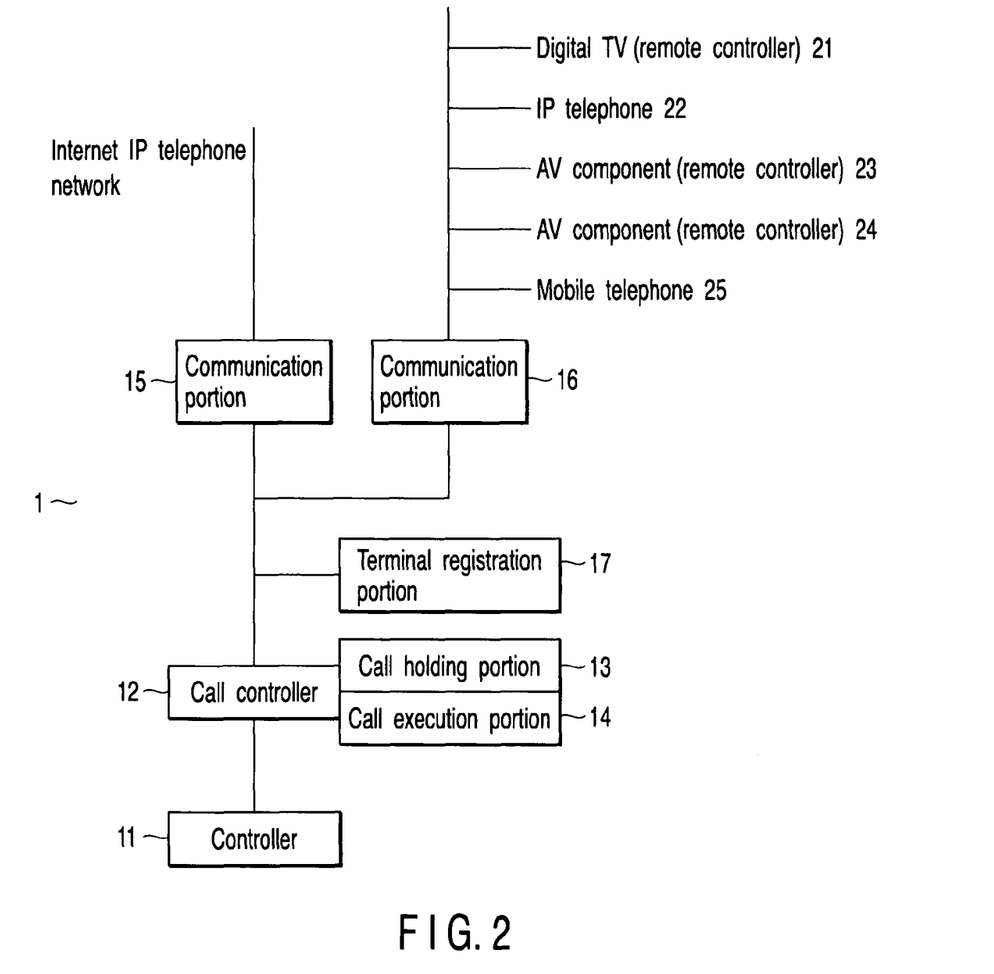
FIG. 2 is a schematic diagram for explaining one example of a temporary response operation of the IP telephone repeater according to one embodiment of the present invention.
Figure 3:
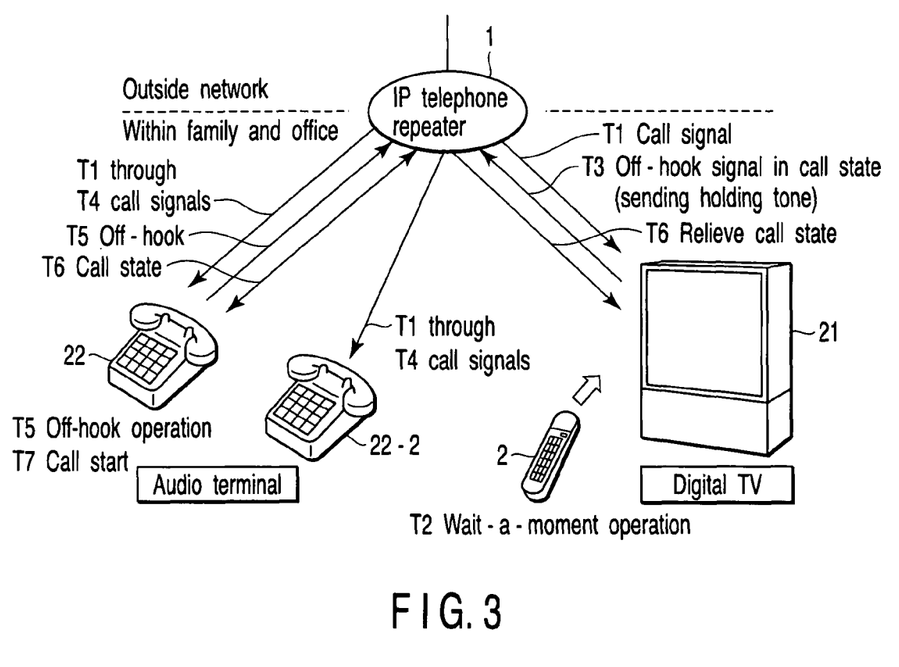
FIG. 3 is a schematic diagram for explaining one example of a holding operation of the IP telephone repeater according to one embodiment of the present invention.
Figure 4:
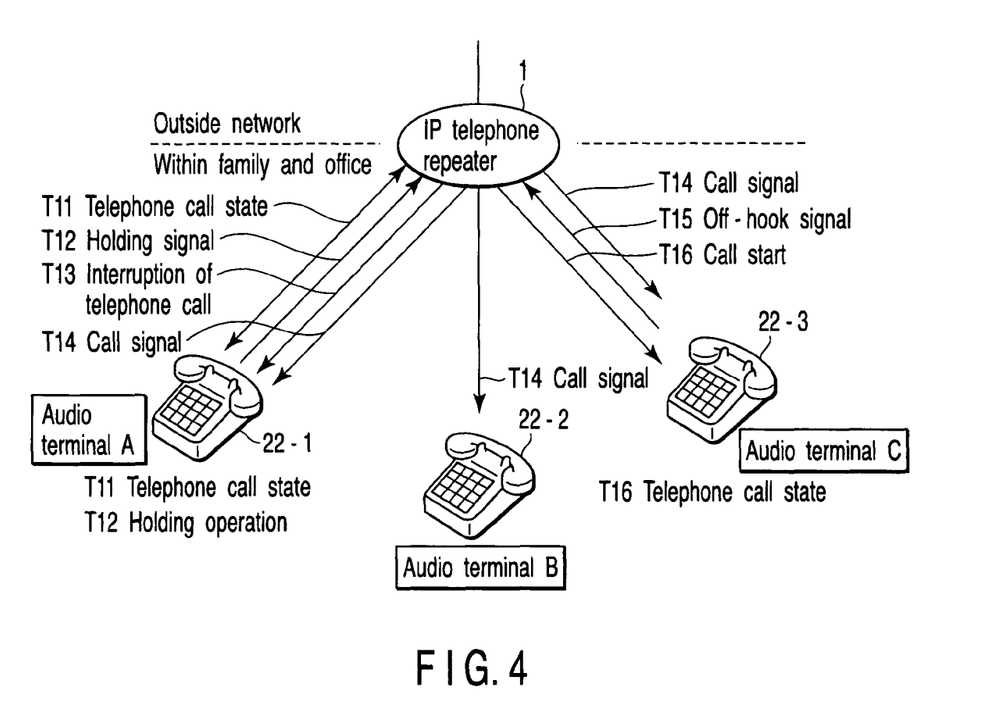
FIG. 4 is a block diagram showing one example of a structure of the IP telephone repeater according to one embodiment of the present invention.
Figure 5:
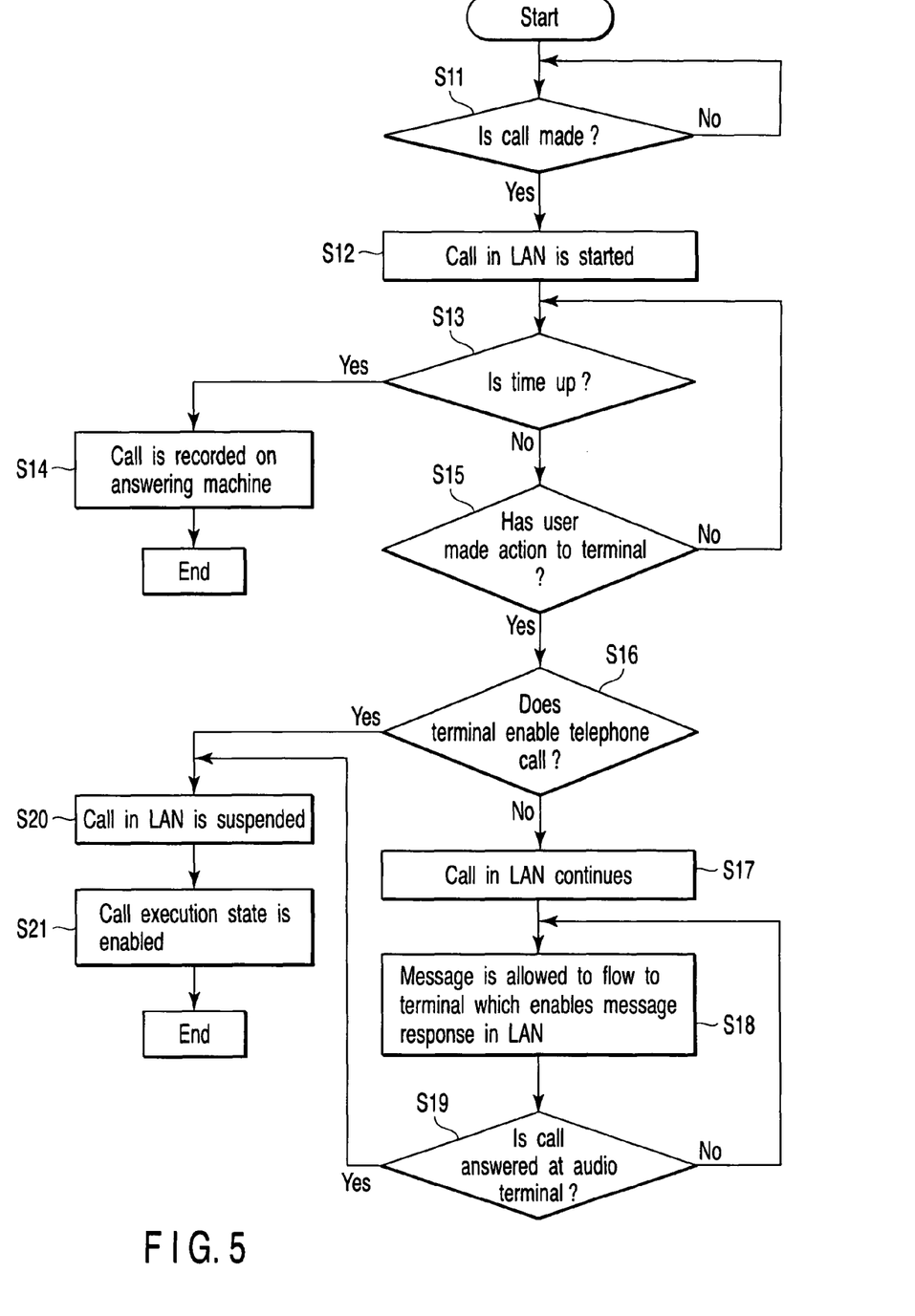
FIG. 5 is a flowchart showing one example of a temporary response operation of the IP telephone repeater according to one embodiment of the present invention.
Figure 6:
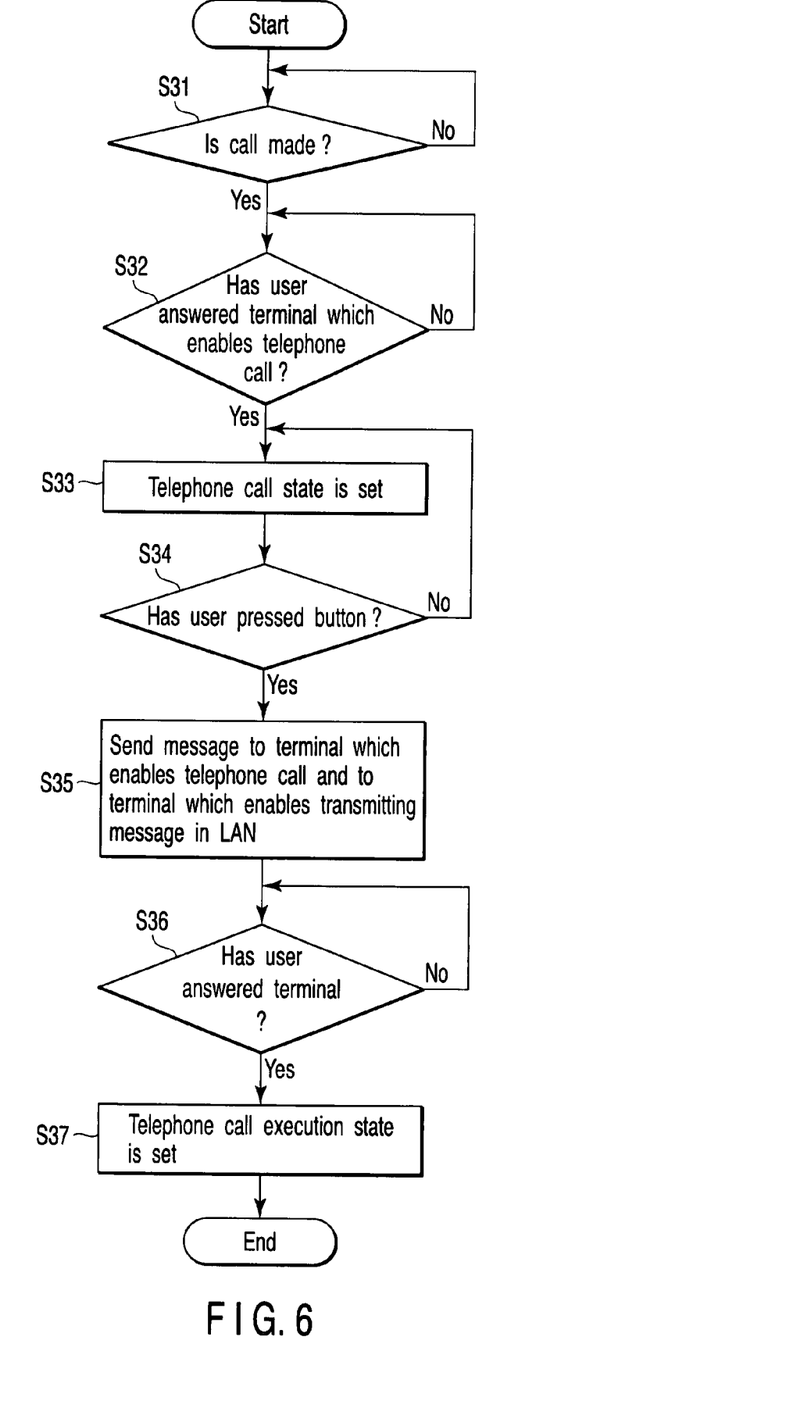
FIG. 6 is a flowchart showing one example of the holding operation of the IP telephone repeater according to one embodiment of the present invention.
Figure 7:
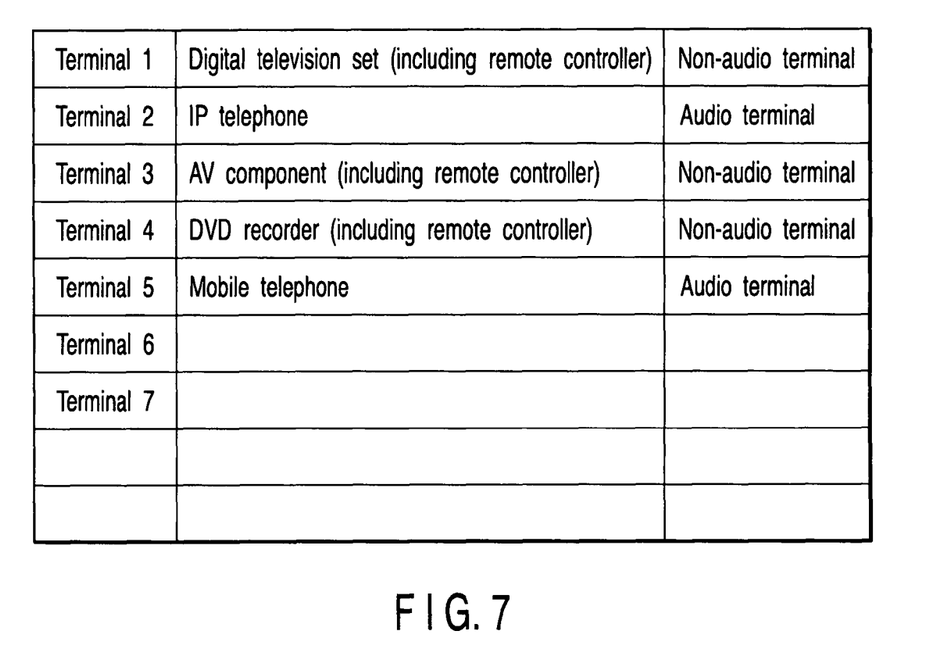
FIG. 7 is a schematic diagram showing a list of terminal devices on a network of the IP telephone repeater according to one embodiment of the present invention.

FIG. 1 is a schematic diagram showing one example of a functional structure of an IP telephone repeater according to one embodiment of the present invention. FIG. 2 is a schematic diagram for explaining one example of a temporary response operation of the IP telephone repeater in the same manner. FIG. 3 is a schematic diagram for explaining one example of an holding operation of the IP telephone repeater in the same manner. FIG. 4 is a block diagram showing one example of a structure of the IP telephone repeater in the same manner. FIG. 5 is a flowchart showing one example of a temporary response operation of the IP telephone repeater in the same manner. FIG. 6 is a flowchart showing one example of the holding operation of the IP telephone repeater in the same manner. FIG. 7 is a schematic diagram showing a list of terminal devices on the network of the IP telephone repeater in the same manner.

<One Example of the IP Telephone Repeater According to One Embodiment of the Present Invention>

(Structure)

In the beginning, a structure of an IP telephone repeater according to one embodiment of the present invention will be explained by referring to the drawings. With respect to an IP telephone repeater 1, different devices are selected depending on the function required in the telephone call and the usage place thereof. Several devices are simultaneously assembled to each other to be used. Examples of a specific function division include, as shown in FIG. 1, a tone input and output, imaging, image display, call notice, caller ID display, key input and the like. However, the functions are not limited thereto.

A specific structure of such IP telephone repeater 1 has, as shown in FIG. 2, a controller 11 for commanding an entire control operation, a call controller 12 for managing an arrival of an incoming call from the outside, a call holding portion 13 for holding the incoming call, a call execution portion 14 for executing a telephone call to this incoming call, a communication portion 15 connected to the internet IP telephone network for conducting communication, a communication portion 16 connected to the IP telephone network of a domestic local area network (LAN) for conducting communication, and a terminal registration portion 17 for registering the kind of each terminal, and attribute information of audio terminals and non-audio terminals in the local area network as shown in FIG. 7. Here, the IP telephone network of the domestic local area network or the like includes Bluetooth®, and a network such as LAN (local area network). However, the network is not limited thereto.

(Response Operation by Means of Non-Audio Terminal: First Embodiment)

In the IP telephone repeater having such a structure, a response operation by means of the non-audio terminal will be explained in detail by using a schematic diagram shown in FIG. 3 and a flowchart shown in FIG. 5.

In the IP telephone repeater having such a structure, as shown in FIG. 3, when an incoming call arrives, a response operation is enabled by means of a remote controller 2 or the like of a digital television set 21 which is a non-audio terminal functioning in the local area network within the family or the office.

That is, in FIG. 3, procedures up to a telephone call with respect to the incoming call, conducted among the IP telephone repeater 1, IP telephones 22 and 22-2, the digital television 21 and the remote controller 2, will be described hereinbelow corresponding to the flowchart of FIG. 5 at the timing T1 through T7.

At the timing T1, when the IP telephone repeater 1 detects an incoming call via the communication portion 15 with the function of the controller 11 and the call controller 12 (step S11), a jingle signal is supplied to the transmission side. In addition, the IP telephone repeater 1 supplies a jingle signal to the IP telephones 22 and 22-2 and the digital television 21 to start a call within the local area network (step S12). Here, with respect to each terminal within the local area network, various methods are preferable in the following cases: a case in which the incoming call lamp is lit by ringing an incoming call of all the terminal devices; a case in which the incoming call lamp is lit by ringing an incoming call of only the terminal devices which enable a telephone call; a case in which the incoming call lamp or the like is merely lit with respect to the terminal devices; a case in which a message of additional information which is an image indicating a hold is displayed on a display portion; and a case in which no message is given.

Here, when it is judged that the time is up after the call continues for a predetermined time or more with the operation of the controller 11 and the call controller 12 (step S13), it is preferable that a message signal is given to the side of the call sender by using a recording portion not shown, and the message from the partner of the call is recorded on the phone answering machine (step S14).

At the timing T2, the IP telephone repeater 1 supplies a jingle signal to the side of the call sender by means of the operation of the controller 11 and the call controller 12 and supplies the jingle signal to the IP telephones 22 and 22-2.

On the other hand, in the case where this incoming call cannot be answered immediately, the user performs a "wait-a-moment" operation with the remote controller 2 of the television set. As a result, the IP telephone repeater 1 detects an operation signal of the user's remote controller 2 from the digital television set 21 by means of the operation of the controller 11 and the call controller 12 (step S15).

Then, an off-hook signal is transmitted to the IP telephone repeater 1 from the digital television set 21 and the digital television set 21 is set to a telephone call state to create a holding tone or the like of "wait a minute" and transmit the tone to the side of the call sender.

At the timing T3, since the digital television set 21 is not a terminal which enables a telephone call, the IP telephone repeater 1 supplies a jingle signal to the IP telephones 22 and 22-2 by means of the operation of the controller 11 and the call controller 12.

Here, when the terminal is a normal mobile telephone or an IP telephone which enables a telephone call (step S16), the call within the LAN is suspended (step S20) to move to the normal call state (step S21). When the terminal is a terminal which does not enable a telephone call such as the remote controller 2 (one of the devices connected to the network which does not enable a telephone call) of the digital television set 21, and composition devices of an AV component 23 (step S16), the IP telephone repeater 1 sets a telephone call state to the terminal by means of the operation of the controller 11 and the call controller 12 and supplies a holding tone signal such as a music from a music box to the call sender. On the other hand, the IP telephone repeater 1 continues to supply a jingle signal to each of the IP terminals within the local area network by means of the operation of the controller 11 and the call controller 12 thereby continuing the call (step S17). Furthermore, at the same time, the IP telephone repeater 1 supplies, to each of the IP terminals in the local area network, a message signal by means of the image signal and a lamp lit signal which is additional information showing that the call is being held by the operation of the controller 11 and the call controller 12 (step S18). In this manner, a notice is made to the user to the effect that the incoming call has arrived, for example, at the digital television set 21 and the audio terminal should be picked up to start conversation.

At the timing T4, the IP telephone repeater 1 continues to supply the jingle signal to each of the IP terminals in the local area network by means of the operation of the controller 11 and the call controller 12, and continues to supply a holding tone signal to the side of the call sender. Furthermore, an attribute which shows that the telephone call is being held is added to the jingle sound.

At the timing T5, it is supposed that the user is prepared to deal with the telephone terminals 22 and 22-2, and a response is made to the telephone terminals 22 and 22-2 which enable a telephone call, with the result that the IP telephone repeater 1 detects the off-hook signal by means of the operation of the controller 11 and the call controller 12 (step S19).

At the timing T6, the IP telephone repeater 1 supplies to the call sender a telephone call signal to set a call execution state by means of the operation of the controller 11 and the call controller 12, and suspends the jingle signal and supplies the telephone call signal to the telephone terminal 22. On the other hand, the telephone call state is relieved to the digital television set 21.

At the timing T7, the IP telephone repeater 1 supplies to the call sender a telephone call signal in order to set a call execution state by means of the operation of the controller 11 and the call controller 12, and supplies the telephone call signal to the telephone terminal 22 in the same manner to set the call execution state thereby enabling a normal telephone call.

In this manner, a temporary response is given to the incoming call by means of the remote controller 2 of the digital television 21 or the like which is an IP terminal serving as a non-audio terminal within the local area network, with the result that an disadvantage of forcing a long time wait on the side of the call sender can be eliminated.

(Holding Operation by Means of Holding Button: Second Embodiment)

Next, in the IP telephone repeater having such a structure, there will be explained in detail a holding operation hereinbelow by using the schematic diagram of FIG. 4 and the flowchart of FIG. 6.

In the IP telephone repeater 1, as shown in FIG. 4, in the presence of the incoming call, a holding operation is conducted to the incoming call after once conducting a telephone call on an audio terminal A 22-1 with the result that the continuation of the telephone call is enabled on an audio terminal C 22-3.

That is, in FIG. 4, with respect to the normal telephone call, the holding operation and the resumption of the telephone call between the IP telephone repeater 1 and the IP telephones A 22-1, B 22-2, and C 22-3, the process at the timings T11 through T16 will be sequentially described hereinbelow in correspondence to the flowchart of FIG. 6.

At the timing T11, when the IP telephone repeater 1 detects the incoming call by means of the operation of the controller 11 and the call controller 12 (step S31), a response is given to the audio terminal A 22-1 from the user (step S32), with the result that the tone signal is repeated to set a telephone call state with the side of the call sender (step S33).

At the timing T12, the IP telephone repeater 1 detects, by means of the operation of the controller 11 and the call controller 12, that the user has pressed down the holding button attached to the audio terminal A 22-1 or the like (step S34).

At the timing T13, the IP telephone repeater 1 conducts a call interruption processing of the audio terminal A 22-1 by means of the controller 11 and the call controller 12.

At the timing T14, the IP telephone repeater 1 supplies, by means of the operation of the controller 11 and the call controller 12, a jingle signal, a lamp signal and a message signal such as an image signal which is additional information showing that the call is being held to the audio terminal A 22-1, the audio terminal B 22-2, the audio terminal C 22-3 or the like which enable a telephone call in the local area network (step S35).

At the timing T15, the IP telephone repeater 1 detects that the user has responded, for example, to the audio terminal C 22-3 by means of the operation of the controller 11 and the call controller 12 (step S36).

At the timing T16, the IP telephone repeater 1 repeats the sound signal between the call sender and the audio terminal C 22-3 to set the call execution state by the operation of the controller 11 and the call controller 12 (step S37).

As a consequence, it becomes possible, by pressing a holding button after a telephone call on any audio terminal, to resume the telephone call on any other audio terminal (processing of transferring the holding) with the IP telephone repeater 1 according to the present invention.

In the various embodiments which have been described above, those skilled in the art can realize the present invention. Furthermore, it is easy for those skilled in the art to think of various variations of these embodiments. It is possible to apply the present invention to various embodiments without any specific capability of inventions. Consequently, the present invention extends over a wide scope which does not contradict the disclosed principle and new characteristics. The present invention is not limited to the aforementioned embodiments.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An IP telephone repeater comprising:
    a first communication portion configured to connect an incoming call from an internet IP telephone network to a local area IP telephone network, the local area IP telephone network including a plurality of terminals;
    a second communication portion connected to the local area IP telephone network; and
    a call controller configured to detect the incoming call and, upon the detection of the incoming call, supply a jingle signal to the incoming call and to the plurality of terminals and a non-audio terminal connected to the second communication portion, and
    after the detection of the incoming call and upon receiving an indication of a wait operation from a remote control device associated with the non-audio terminal, supply a tone to the incoming call,
    wherein the tone provides an indication that the incoming call is on hold, and supply the jingle signal to said plurality of terminals connected to the second communication portion.

2. The IP telephone repeater according to claim 1, wherein the non-audio terminal is a device connected to a network which does not enable a telephone call.

3. The IP telephone repeater according to claim 1, wherein the tone includes a tone message with respect to the incoming call.

4. An IP telephone repeater comprising:
    a first communication portion configured to connect an incoming call from an internet IP telephone network to a local area IP telephone network, the local area IP telephone network including a plurality of terminals;
    a second communication portion connected to the local area IP telephone network; and
    a call controller configured to detect the incoming call and, upon receipt the detection of the incoming call, supply a jingle signal to the incoming call and to the plurality of terminals,
    after the detection of the incoming call and upon receipt of a response indication to set a call execution state from an audio terminal included in the plurality of terminals, supply a telephone call tone to the incoming call, and
    upon receiving indication of a holding operation from the audio terminal, supply a hold tone to the incoming call, wherein the hold tone provides an indication that the incoming call is on hold, and supply the jingle signal to said plurality of terminals connected to the second communication portion.

5. The IP telephone repeater according to claim 4, wherein the call controller supplies additional information showing that the incoming call is being held, together with the jingle signal, to said plurality of terminals connected to the second communication portion in the case where the holding operation is conducted by the audio terminal connected to the second communication portion.

6. An IP telephone repeating system comprising:
    a plurality of IP terminals; and
    an IP telephone repeater having:
    a first communication portion configured to connect an incoming call from an internet IP telephone network to a local area IP telephone network, the local area IP telephone network including a plurality of terminals;

a second communication portion connected to the local area IP telephone network; and a call controller configured to detect the incoming call and, upon the detection of the incoming call, supply a jingle signal to the incoming call and to the plurality of terminals and a non-audio terminal connected to the second communication portion, and after the detection of the incoming call and upon receiving an indication of a wait operation from a remote control device associated with the non-audio terminal, supply a tone to the incoming call, wherein the tone provides an indication that the incoming call is on hold, and supply the jingle signal to the plurality of terminals connected to the second communication portion.

7. The IP repeating system according to claim 6, wherein the non-audio terminal is a device which is connected to a network which does not enable a telephone call.

8. The IP repeating system according to claim 6, wherein the tone includes a tone message with respect to the incoming call.

9. An IP telephone repeating system comprising:
a plurality of IP terminals; and
an IP telephone repeater having:
a first communication portion configured to connect an incoming call from an internet IP telephone network to a local area IP telephone network, the local area IP telephone network including a plurality of terminals;
a second communication portion connected to the local area IP telephone network; and
a call controller configured to detect the incoming call and, upon the detection of the incoming call, supply a jingle signal to the incoming call and to the plurality of terminals, after the detection of the incoming call and upon receipt of a response indication to set a call execution state from an audio terminal included in the plurality of terminals, supply a telephone call tone to the incoming call, and upon receiving indication of a holding operation from the audio terminal, supply a hold tone to the incoming call, wherein the hold tone provides an indication that the incoming call is on hold, and supply the jingle signal to said plurality of terminals connected to the second communication portion.

10. The IP telephone repeating system according to claim 9, wherein the call controller supplies additional information showing that the incoming call is being held, together with the jingle signal, to said plurality of terminals connected to the second communication portion in the case where the holding operation is conducted by the audio terminal connected to the second communication portion.

11. An IP telephone repeating method between a terminal of an internet IP telephone network and a terminal of a local area IP telephone network, the method comprising:
detecting an incoming call from the terminal of the internet IP telephone network;
supplying, after detecting the incoming call, a jingle signal to the incoming call and to a plurality of terminals and a non-audio terminal on the local area IP telephone network;
supplying, upon receiving indication of a wait operation from a remote control device associated with the non-audio terminal, a tone to the incoming call, wherein the tone provides an indication that the incoming call is on hold; and
supplying the jingle signal to said plurality of terminals of the local area IP telephone network.

12. An IP telephone repeating method between a terminal of an internet IP telephone network and a terminal of a local area IP telephone network, the method comprising:
detecting an incoming call from the terminal of the internet IP telephone network;
supplying, after detecting the incoming call, a jingle signal to the incoming call and to an audio terminal included in the plurality of terminals of the local area IP telephone network;
supplying, after the detection of the incoming call and upon receipt of a response operation to set a call execution state from the audio terminal, a telephone call tone to the incoming call and to the plurality of terminals;
supplying, upon receiving indication of a holding operation from the audio terminal, a hold tone to the incoming call, wherein the hold tone provides an indication that the incoming call is on hold; and
supplying the jingle signal to said plurality of terminals of the local area IP telephone network.

\* \* \* \* \*

UNITED STATES PATENT AND TRADEMARK OFFICE
CERTIFICATE OF CORRECTION

| | | |
|---|---|---|
| PATENT NO. | : 8,111,703 B2 | Page 1 of 1 |
| APPLICATION NO. | : 11/790392 | |
| DATED | : February 7, 2012 | |
| INVENTOR(S) | : Nemoto | |

It is certified that error appears in the above-identified patent and that said Letters Patent is hereby corrected as shown below:

Claim 4, column 6, line 41, change "upon receipt the detection of the incoming call" to --upon the detection of the incoming call--.

Signed and Sealed this
Fifteenth Day of May, 2012

David J. Kappos
*Director of the United States Patent and Trademark Office*